(12) United States Patent
Bjerke et al.

(10) Patent No.: US 11,174,890 B1
(45) Date of Patent: Nov. 16, 2021

(54) FASTENER RETAINING COMPONENT

(71) Applicant: Caterpillar Inc., Peoria, IL (US)

(72) Inventors: Nathan Bjerke, Peoria, IL (US); Thomas Marshall Congdon, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/870,416

(22) Filed: May 8, 2020

(51) Int. Cl.
F16B 39/02 (2006.01)
F16B 39/01 (2006.01)

(52) U.S. Cl.
CPC .................... F16B 39/02 (2013.01)

(58) Field of Classification Search
CPC ................. F16B 39/02; F16B 39/01
See application file for complete search history.

(56) References Cited

U.S. PATENT DOCUMENTS

| | | | | |
|---|---|---|---|---|
| 2,853,113 A * | 9/1958 | Balint | ............ | F16B 37/044 411/103 |
| 3,336,828 A * | 8/1967 | Granger | ............ | F16B 37/067 411/432 |
| 3,455,201 A * | 7/1969 | Ryder | ............ | F16B 21/076 411/15 |
| 3,579,942 A * | 5/1971 | Cole | ............ | F16B 5/01 52/787.12 |
| 4,428,705 A * | 1/1984 | Gelhard | ............ | F16B 37/122 29/460 |
| 4,778,320 A * | 10/1988 | Nakama | ............ | F16B 5/065 24/297 |
| 6,227,782 B1 | 5/2001 | Bowling et al. | | |
| 6,478,519 B1 * | 11/2002 | Genick, II | ............ | F16B 5/0258 411/353 |
| 7,088,297 B2 * | 8/2006 | Nakano | ............ | H01Q 1/3275 343/713 |
| 7,503,629 B2 * | 3/2009 | Klabisch | ............ | E21C 35/1936 299/113 |
| 8,378,220 B2 * | 2/2013 | Ochi | ............ | F16B 39/01 174/138 D |
| 2002/0159861 A1 * | 10/2002 | Genick, II | ............ | F16B 5/0258 411/353 |

(Continued)

FOREIGN PATENT DOCUMENTS

| | | | | |
|---|---|---|---|---|
| CN | 2878773 Y | | 3/2007 | |
| CN | 108757695 | * | 11/2018 | ............ F16B 37/00 |

(Continued)

*Primary Examiner* — Bayan Salone
(74) *Attorney, Agent, or Firm* — Harrity & Harrity LLP

(57) ABSTRACT

A fastener retaining component may comprise a first elongated member. A length of the first elongated member may be greater than a diameter of a fastener receiving element of a component. The fastener retaining component may further comprise a second elongated member. A length of the second elongated member may be greater than the diameter of the fastener receiving element. The fastener retaining component may be configured to be press-fit within the fastener receiving element such that press-fitting the fastener retaining component, within the fastener receiving element, increases a tension in the fastener retaining component to cause the first elongated member and the second elongated member to engage with an inner surface of the fastener receiving element and to retain a fastener within the fastener receiving element.

20 Claims, 3 Drawing Sheets

(56) References Cited

U.S. PATENT DOCUMENTS

| | | | | |
|---|---|---|---|---|
| 2008/0007107 A1* | 1/2008 | Klabisch | ............ | E21C 35/1936 |
| | | | | 299/102 |
| 2011/0305538 A1* | 12/2011 | Savoy | ................... | F16B 39/02 |
| | | | | 411/194 |
| 2016/0115985 A1 | 4/2016 | Jagdale et al. | | |

FOREIGN PATENT DOCUMENTS

| | | | |
|---|---|---|---|
| CN | 108757695 | A | 11/2018 |
| EM | 007510888-0002 | S | 1/2020 |
| EP | 0222545 | | 4/1990 |
| JP | D1544765 | S | 1/2016 |
| JP | 1544765 | S * | 2/2016 |
| KR | 300912791.0000 | S | 6/2017 |
| KR | 300997691.0000 | S | 3/2019 |

\* cited by examiner

FASTENER RETAINING COMPONENT

TECHNICAL FIELD

The present disclosure relates generally to a fastener retaining component to hold a position of a fastener within a component.

BACKGROUND

Ground engaging tools may be secured in place to a work implement of a machine, such as a mining machine, a construction machine, an earth moving machine, and/or the like. For example, the ground engaging tools may be secured using bolts positioned within the ground engaging tools. In light of the significant size and weight of the work implement and the ground engaging tools, the work implement may be suspended (e.g., using a crane or other suspension mechanism) during the process of securing the ground engaging tools to the work implement. In this regard, securing the ground engaging tools to the work implement may require one or more workers to position the bolts within the ground engaging tools while manually supporting the suspended work implement.

An anti-loosening unit bolt nut with fixing device is disclosed in Chinese Patent Application Publication No. 108757695 issued to Jining Polytechnic ("the '695 publication"). The '695 publication discloses that the anti-loosening unit bolt nut includes a bolt, a fixed transverse rod, and a groove nut. While the '695 publication discloses an anti-loosening unit bolt nut with fixing device, the '695 publication does not address the problems above with respect to securing the ground engaging tools to the work implement.

The fastener retaining component of the present disclosure solves one or more of the problems set forth above and/or other problems in the art.

SUMMARY

According to some implementations, a fastener retaining component may include a first elongated member comprising: a first set of component engaging elements extending from a first end of the first elongated member to engage with the component, a second set of component engaging elements extending from a second end of the first elongated member to engage with the component, and a first middle portion to engage with the fastener; and a second elongated member comprising: a third set of component engaging elements extending from a first end of the second elongated member to engage with the component, a fourth set of component engaging elements extending from a second end of the second elongated member to engage with the component, and a second middle portion to engage with the fastener.

According to some implementations, a system may include a fastener; and a fastener retaining component to retain the fastener within a fastener receiving element of the component, the fastener retaining component comprising: a first elongated member, a length of the first elongated member being greater than a diameter of the fastener receiving element, and a second elongated member, a length of the second elongated member being greater than the diameter of the fastener receiving element, the fastener retaining component being configured to be press-fit within the fastener receiving element such that press-fitting the fastener retaining component, within the fastener receiving element, increases a tension in the fastener retaining component to cause the first elongated member and the second elongated member to engage with an inner surface of the fastener receiving element and to retain the fastener within the fastener receiving element.

According to some implementations, a fastener retaining component may include a first elongated member, a length of the first elongated member being greater than a diameter of a fastener receiving element of a component, and a second elongated member, a length of the second elongated member being greater than the diameter of the fastener receiving element, the fastener retaining component being configured to be press-fit within the fastener receiving element such that press-fitting the fastener retaining component, within the fastener receiving element, increases a tension in the fastener retaining component to cause the first elongated member and the second elongated member to engage with an inner surface of the fastener receiving element and to retain a fastener within the fastener receiving element.

DETAILED DESCRIPTION

This disclosure relates to a fastener retaining component to hold a position of a fastener within a component. The fastener retaining component has universal applicability to different machines. The term "machine" may refer to any machine that performs an operation associated with an industry, such as, for example, mining, construction, farming, transportation, or any other industry. As some examples, the machine may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or another above ground equipment, underground equipment, or marine equipment. Moreover, one or more implements may be connected to the machine.

Figure 1:
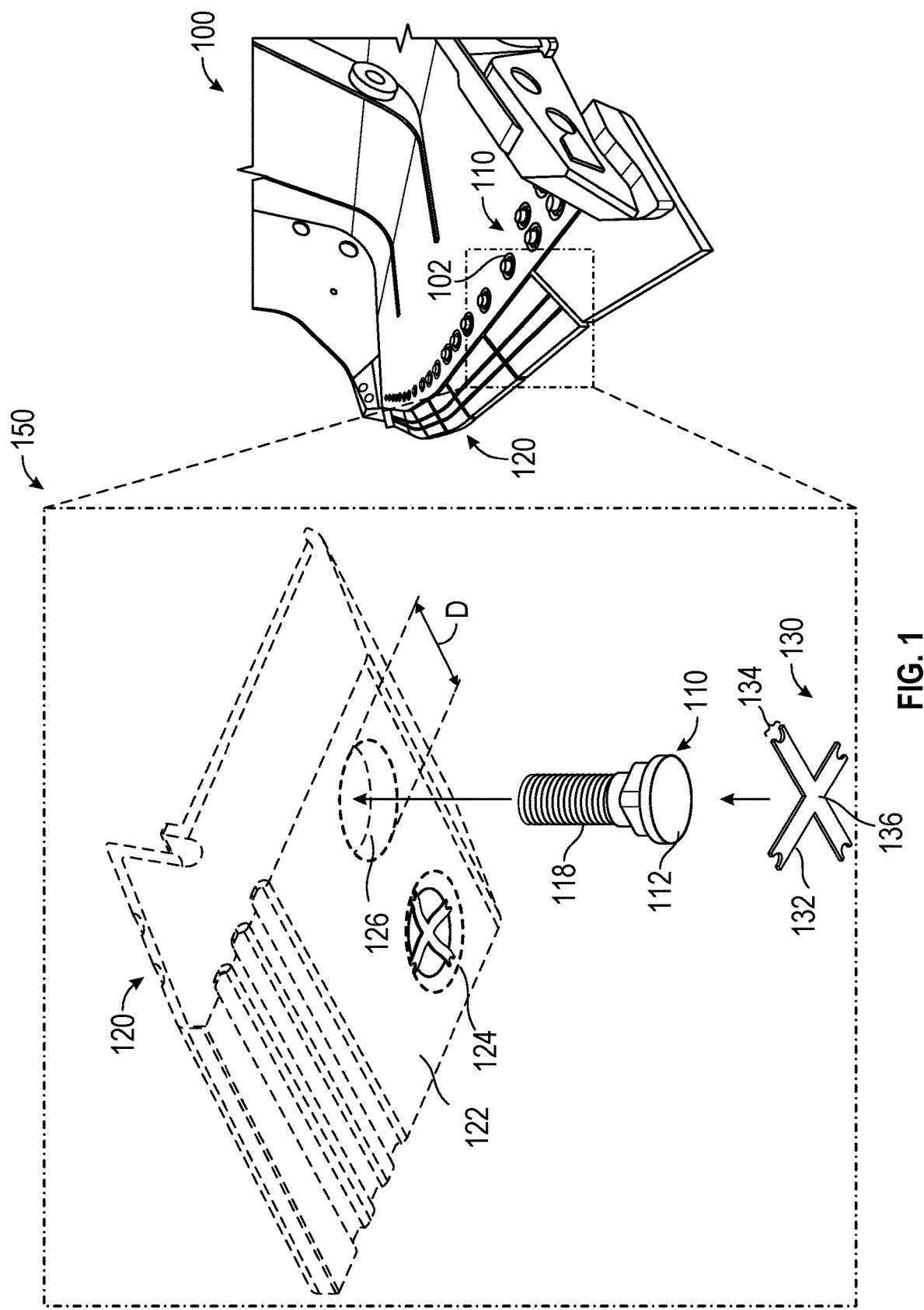
FIG. 1 is a diagram of an example receiving structure to which multiple components are coupled via multiple fasteners.

FIG. 1 is a diagram of an example receiving structure to which multiple components are coupled via multiple fasteners. As an example, receiving structure 100 may be an implement of a machine. Receiving structure 100 is shown in FIG. 1 as a load bucket but may be another type of implement. As shown in FIG. 1, one or more fasteners 110 (referred to individually as "fastener 110" and collectively as "fasteners 110") may secure one or more components 120 (referred to individually as "component 120" and collectively as "components 120") to receiving structure 100. For example, each component 120 may be mechanically coupled to receiving structure 100 via one or more fasteners 110 received through one or more work implement holes 102.

As shown in FIG. 1, fastener 110 is a plow bolt. Alternatively, fastener 110 may include a carriage bolt or a hex head bolt. As shown in FIG. 1, fastener 110 includes a head 112 and a thread component 118. Component 120 may be configured to perform work on material. As shown in FIG. 1, for example, component 120 is a ground engaging tool, such as a ground engaging tooth. However, component 120 may be another component that may be secured to receiving structure 100. As shown in FIG. 1, component 120 includes a bottom surface 122 with one or more fastener receiving elements 124 (referred to individually as "fastener receiving element 124" and collectively as "fastener receiving elements 124") that may receive one or more fasteners 110. Each fastener receiving element 124 may include an inner surface 126 and may have a diameter D.

As shown in FIG. 1, fastener 110 is received through fastener receiving element 124 of component 120. A portion of fastener 110 may be received through fastener receiving element 124. For example, thread component 118 of fastener 110 may be received through fastener receiving element 124.

As shown in FIG. 1, fastener retaining component 130 may be inserted in fastener receiving element 124 after fastener 110 is received through fastener receiving element 124. As shown in FIG. 1, fastener retaining component 130 includes elongated members 132 (referred to individually as "elongated member 132" and collectively as "elongated members 132"). An elongated member 132 includes a set of component engaging elements 134 (referred to individually as "component engaging elements 134" and collectively as "component engaging elements 134") and a middle portion 136. As shown in FIG. 1, component engaging elements 134 may be configured to engage with inner surface 126 of fastener receiving element 124 when fastener retaining component 130 is inserted within fastener receiving element 124. Additionally, middle portion 136 may be configured to engage with head 112 of fastener 110 when fastener retaining component 130 is inserted within fastener receiving element 124.

In this regard, as will be explained in more detailed below, fastener retaining component 130 may be configured to be press-fit within fastener receiving element 124 such that press-fitting fastener retaining component 130, within fastener receiving element 124, increases a tension in fastener retaining component 130 to cause elongated members 132 to engage with inner surface 126 of fastener receiving element 124 and to retain fastener 110 within fastener receiving element 124.

As shown in FIG. 1, system 150 (or pre-installation system 150) includes fasteners 110, component 120, and fastener retaining components 130. As will be apparent from the description herein, by retaining fasteners 110 within fastener receiving elements 124 using fastener retaining components 130 prior to securing component 120 to receiving structure 100, the process of securing component 120 to receiving structure 100 may be improved.

As indicated above, FIG. 1 is provided as an example. Other examples may differ from what was described in connection with FIG. 1.

Figure 2:
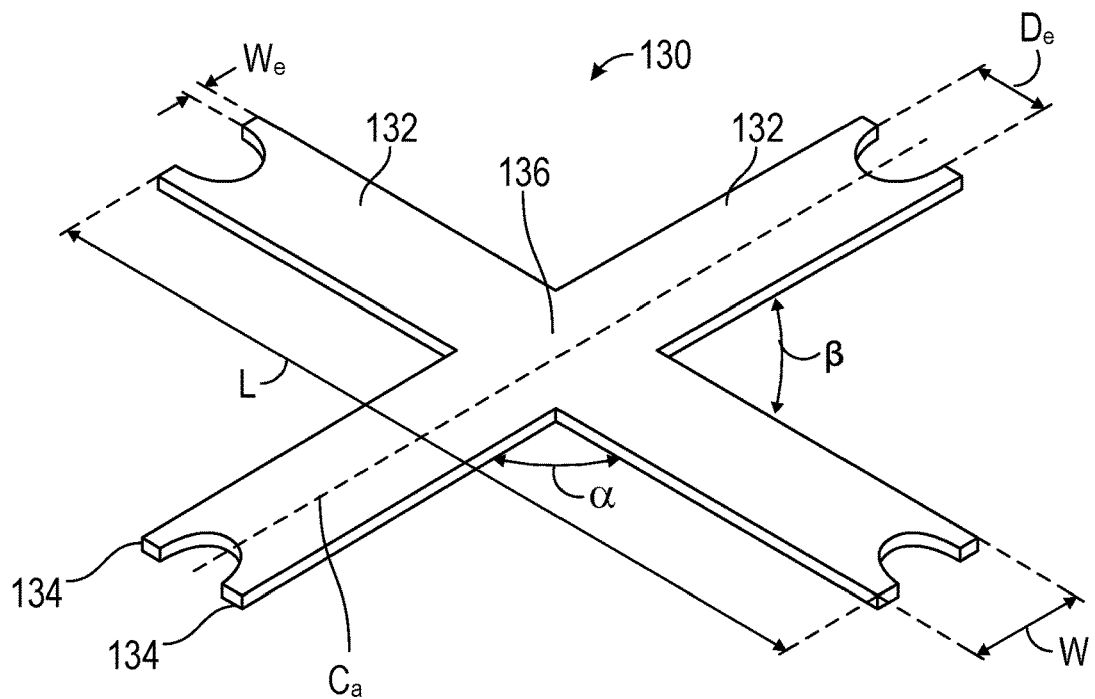
FIG. 2 is a diagram of an example fastener retaining component that may be used with the fasteners of FIG. 1.

FIG. 2 is a diagram of an example fastener retaining component 130 that may be used with the fasteners of FIG. 1. In some implementations, fastener retaining component 130 may be constructed from a flexible material, such as spring steel. As shown in FIG. 2, fastener retaining component 130 is in a rested configuration (or rested state) prior to being inserted in fastener receiving element 124. Fastener retaining component 130 may transition to a tensioned configuration (or tensioned state) when inserted in fastener receiving element 124, as will be described in more detail in connection with FIG. 3.

As shown in FIG. 2, fastener retaining component 130 includes elongated members 132. Elongated members 132 may be formed from a same sheet of material (e.g., a same sheet metal such as, for example, spring steel). For example, elongated members 132 may be formed by stamping the sheet of material, laser cutting the sheet of material, flame cutting the sheet of material, water cutting the sheet of material, and/or the like. As shown in FIG. 2, fastener retaining component 130 includes two elongated members 132 that form an X shape with an angle $\alpha$ and an angle $\beta$. In some implementations, angle $\alpha$ may be equal to angle $\beta$. Alternatively, angle $\alpha$ may be less than angle $\beta$. Alternatively, angle $\alpha$ may be greater than angle $\beta$.

As shown in FIG. 2, each elongated member 132 has a length L and a width W. Length L may be greater than diameter D of fastener receiving element 124. An elongated member 132 includes a first set of component engaging elements 134 extending from a first end, a middle portion 136, and a second set of component engaging elements 134 extending from a second end that is opposite the first end. Middle portion 136 may be located between the first end and the second end. The first set of component engaging elements 134 and the second set of component engaging elements 134 may include the same number of component engaging elements 134. Alternatively, the first set of component engaging elements 134 and the second set of component engaging elements 134 may include different numbers of component engaging elements 134. In some implementations, an elongated member 132 may include a single set of component engaging elements 134.

As shown in FIG. 2, elongated members 132 may share a same middle portion 136. The number, arrangement, and dimensions of elongated members 132 shown in FIG. 2 are merely provided as an example. In practice, fastener retaining component 130 may have a different (greater or lesser) number, a different arrangement, and/or different dimensions of elongated members 132 than what is shown in FIG. 2.

Each set of component engaging elements 134 may include one or more component engaging elements 134 that are configured to engage with inner surface 126 of fastener receiving element 124 when fastener retaining component 130 is inserted within fastener receiving element 124. As shown in FIG. 2, a component engaging element 134 may have a width $W_e$. As shown in FIG. 2, a distance $D_e$ separates each component engaging element 134 of a set of component engaging elements 134. In some implementations, width $W_e$ and distance $D_e$ may be proportional to width W. For example, width $W_e$ may be ¼ of width W and $D_e$ may be ½ of width W. The number, arrangement, and dimensions of component engaging elements 134 shown in FIG. 2 are merely provided as an example. In practice, fastener retaining component 130 may have a different (greater or lesser) number, a different arrangement, and/or different dimensions of component engaging elements 134 than what is shown in FIG. 2.

In some implementations, middle portion 136 may be configured to be aligned with respect to a center point of fastener receiving element 124 (e.g., a center of diameter D) when fastener retaining component 130 is inserted within fastener receiving element 124. For example, middle portion 136 may be configured to be centered with respect to the center point of fastener receiving element 124. In this regard, a central axis Ca (or longitudinal axis) of an elongated member 132 may intersect the center of diameter D of fastener receiving element 124.

As indicated above, FIG. 2 is provided as an example. Other examples may differ from what was described in connection with FIG. 2. For example, instead of elongated members 132 sharing a same middle portion 136 as shown in FIG. 2, elongated members 132 may be separate elements (e.g., two separate elongated members 132, three separate elongated members 132, and so on). In this regard, elongated members 132 may be connected (e.g., at their respective middle portion 136) using a fastening element such as, for example, a rivet, a pin, a screw, and/or the like.

Figure 3:
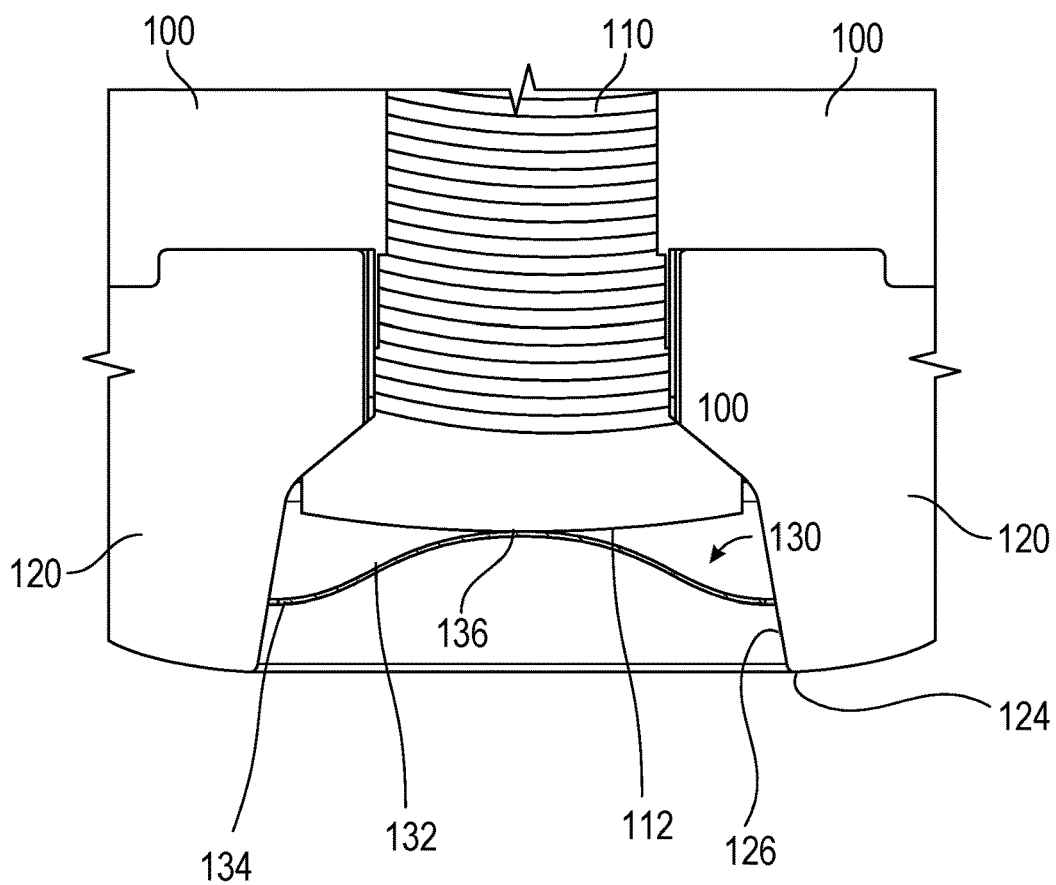
FIG. 3 is a cross-sectional view diagram of the receiving structure of FIG. 1 to which a component of FIG. 1 is coupled via a fastener of FIG. 1.

FIG. 3 is a cross-sectional view diagram of the receiving structure 100 of FIG. 1 to which a component of FIG. 1 is coupled via a fastener of FIG. 1. As shown in FIG. 3, component 120 is mechanically coupled to receiving structure 100 via fastener 110. As shown in FIG. 3, fastener retaining component 130 may be inserted in fastener receiving element 124 after fastener 110 is received through fastener receiving element 124. For example, after fastener 110 is received through fastener receiving element 124, fastener retaining component 130 may be press-fit within fastener receiving element 124. In this regard, fastener retaining component 130 may transition from a rested configuration (prior to being press-fit as shown in FIG. 2) to a tensioned configuration that causes elongated member 132 to press outwardly to engage with inner surface 126 of fastener receiving element 124. As shown in FIG. 3, component engaging elements 134 engage with inner surface 126 of fastener receiving element 124. Additionally, middle portion 136 may be extended inwardly to engage with head 112 of fastener 110.

In other words, press-fitting fastener retaining component 130 within fastener receiving element 124 increases a tension in fastener retaining component 130 to cause elongated member 132 to engage with inner surface 126 of fastener receiving element 124 and cause middle portion 136 to engage with head 112 of fastener 110, thereby retaining fastener 110 within fastener receiving element 124. Accordingly, using fastener retaining component 130 to retain fasteners 110 within component 120 (prior to securing component 120 to receiving structure 100) decreases or eliminates the need to manually support receiving structure 100 (e.g., suspended using a suspension mechanism) when securing component 120 to receiving structure 100.

While the disclosure herein is provided with respect to using fastener retaining component 130 to retain or secure the position of fastener 110, the foregoing disclosure may be applicable to using fastener retaining component 130 to retain or secure the position of a screw, a pin, a rivet, and/or the like.

As indicated above, FIG. 3 is provided as an example. Other examples may differ from what was described in connection with FIG. 3.

Figure 4:
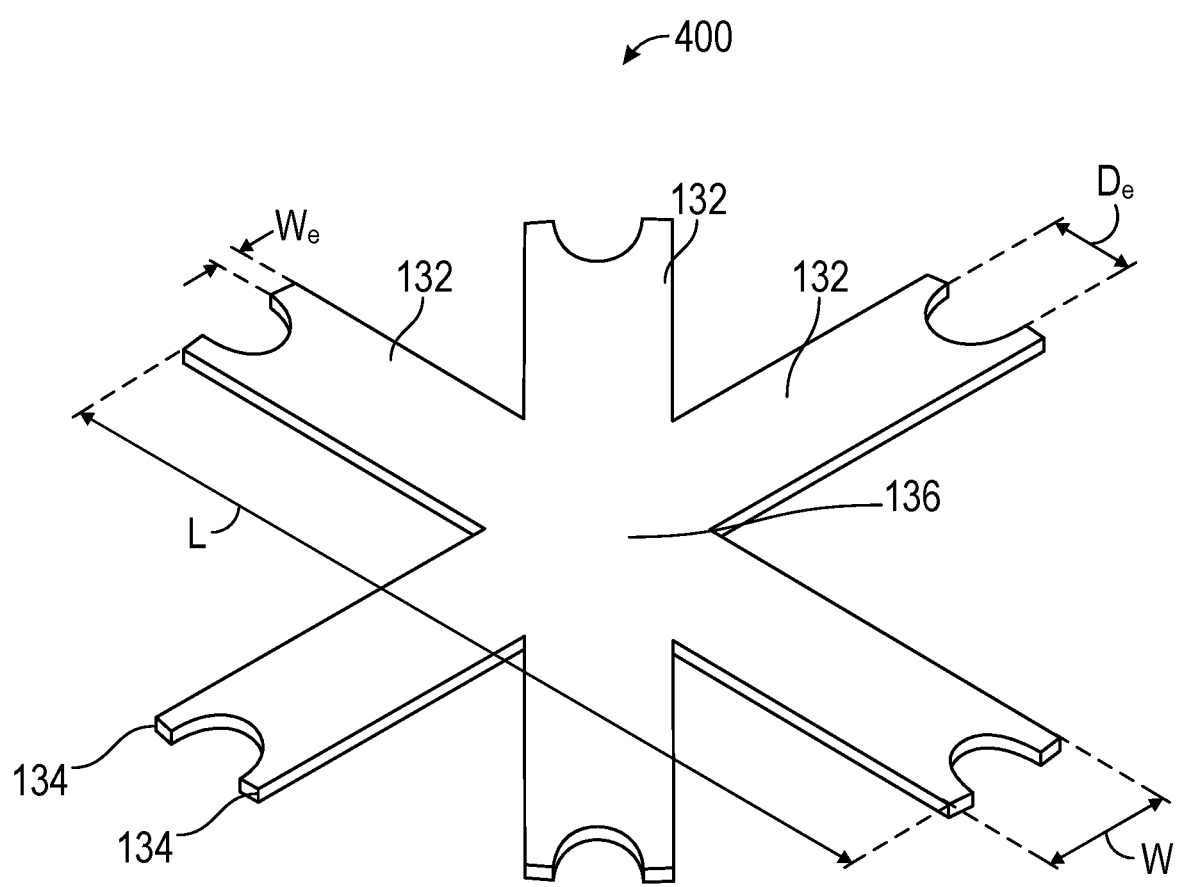
FIG. 4 is a diagram of an example fastener retaining component that may be used with the fasteners of FIG. 1.

FIG. 4 is a diagram of an example fastener retaining component 400 that may be used with a fastener of FIG. 1. The elements of fastener retaining component 400 have been described above with respect to FIG. 2. As shown in FIG. 4, fastener retaining component 400 includes an additional elongated member 132.

In practice, fastener retaining component 130 may have different shapes in different contexts. One example of a different shape of fastener retaining component 130 is shown in FIG. 4. In other contexts, fastener retaining component 130 may be I-shaped (with a single elongated member 132), Y-shaped (with three elongated members 132 meeting at middle portion 136), eight-point asterisk-shaped (with four elongated members 132 meeting at middle portion 136), and/or the like.

As indicated above, FIG. 4 is provided as an example. Other examples may differ from what was described in connection with FIG. 4.

INDUSTRIAL APPLICABILITY

The disclosed fastener retaining component (e.g., fastener retaining component 130, fastener retaining component 400, and/or the like) may be used with different fasteners in different components to maintain the position of the fasteners within the components. The disclosed fastener retaining component may be configured to be inserted in a fastener receiving element of a component (e.g., by being press-fit in the fastener retaining component) after the fastener has been received through the fastener receiving element. The disclosed fastener retaining component may include elongated members (e.g., elongated members 132) with component engaging elements (e.g., component engaging elements 134) and a middle portion (e.g., middle portion 136). In this regard, the component engaging elements engage with an inner surface of a component while the middle portion engages with a fastener inserted in a fastener receiving element of the component, thereby securing a position of the fastener within the component.

Several advantages may be associated with the disclosed fastener retaining component. For example, using the fastener retaining component to retain a fastener within a component prior to securing the component to a receiving structure may decrease or eliminate the need to manually support the receiving structure when securing the component to the receiving structure. In this case, the receiving structure may be suspended using a suspension mechanism due to the size and weight of the receiving structure. Thus, the installation process of the component on the receiving structure may be improved. For example, the speed of the installation process may be improved by decreasing or eliminating the need to manually support the receiving structure during the installation process. As it may be apparent from the description herein, it is not desirable to position a fastener within the component while manually supporting the suspended receiving structure.

Furthermore, pre-installing the fastener within the component and using the fastener retaining component to retain the fastener within the component may improve the accuracy of the installation process of the component on the receiving structure. Furthermore, pre-installing the fastener within the component and using the fastener retaining component to retain the fasteners within a component may reduce the amount of resources for the installation process. For example, the amount of workers typically required for such installation process may be reduced.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A fastener retaining component to retain a fastener within a fastener receiving element of a component, the fastener retaining component comprising:
   a first elongated member comprising:
      a first set of component engaging elements extending from a first end of the first elongated member to engage with an inner surface of the fastener receiving element,
      a second set of component engaging elements extending from a second end of the first elongated member to engage with the inner surface of the fastener receiving element, and
      a first middle portion to engage with a top surface of a head of the fastener; and
   a second elongated member comprising:
      a third set of component engaging elements extending from a first end of the second elongated member to engage with the inner surface of the fastener receiving element,
      a fourth set of component engaging elements extending from a second end of the second elongated member to engage with the inner surface of the fastener receiving element, and
      a second middle portion to engage with the top surface of the head of the fastener.

2. The fastener retaining component of claim 1, wherein the first middle portion and the second middle portion are a same middle portion shared by the first elongated member and the second elongated member.

3. The fastener retaining component of claim 1, wherein the first elongated member and the second elongated member are formed from a same sheet of material.

4. The fastener retaining component of claim 1, wherein a length of the first elongated member is greater than a diameter of the fastener receiving element,
   wherein a length of the second elongated member is greater than the diameter of the fastener receiving element,
   wherein the first end of the first elongated member is opposite the second end of the first elongated member, and
   wherein the first end of the second elongated member is opposite the second end of the second elongated member.

5. The fastener retaining component of claim 1, wherein the first middle portion of the first elongated member and the second middle portion of the second elongated member are aligned with a center of the fastener receiving element when the fastener retaining component is inserted in the fastener receiving element.

6. The fastener retaining component of claim 1, wherein the fastener retaining component is configured to be press-fit within the fastener receiving element such that press-fitting the fastener retaining component, within the fastener receiving element, increases a tension in the fastener retaining component to cause the first elongated member and the second elongated member to engage with the inner surface of the fastener receiving element and to retain the fastener within the fastener receiving element.

7. A system for coupling a component to a receiving structure, the system comprising:
   a fastener; and
   a fastener retaining component to retain the fastener within a fastener receiving element of the component, the fastener retaining component comprising:
      a first elongated member,
         a length of the first elongated member being greater than a diameter of the fastener receiving element, and
      a second elongated member,
         a length of the second elongated member being greater than the diameter of the fastener receiving element,
         the fastener retaining component being configured to be press-fit within the fastener receiving element such that press-fitting the fastener retaining component, within the fastener receiving element, increases a tension in the fastener retaining component to cause the first elongated member and the second elongated member to engage with an inner surface of the fastener receiving element and to retain the fastener within the fastener receiving element,
         a middle portion, of the first elongated member, being configured to engage with a top surface of a head of the fastener, and
         a middle portion, of the second elongated member, being configured to engage with the top surface of the head of the fastener.

8. The system of claim 7, wherein the fastener includes a plow fastener.

9. The system of claim 7, wherein the fastener retaining component comprises spring steel.

10. The system of claim 7, wherein a longitudinal axis, of the first elongated member, intersects a central point of the fastener receiving element such that the first elongated member is centered with respect to the fastener receiving element.

11. The system of claim 7, wherein the first elongated member comprises:
   a first set of component engaging elements extending from a first end of the first elongated member to engage with the inner surface of the fastener receiving element, and
   a second set of component engaging elements extending from a second end of the first elongated member to engage with the inner surface of the fastener receiving element, wherein the second elongated member comprises:
   a third set of component engaging elements extending from a first end of the second elongated member to engage with the inner surface of the fastener receiving element, and
   a fourth set of component engaging elements extending from a second end of the second elongated member to engage with the inner surface of the fastener receiving element, and
   wherein the first elongated member and the second elongated member are separate elements.

12. The system of claim 7, wherein the first elongated member and the second elongated member are formed from a same sheet of material.

13. A fastener retaining component comprising:
a first elongated member,
   a length of the first elongated member being greater than a diameter of a fastener receiving element of a component, and
a second elongated member,
   a length of the second elongated member being greater than the diameter of the fastener receiving element,
   the fastener retaining component being configured to be press-fit within the fastener receiving element such that press-fitting the fastener retaining component, within the fastener receiving element, increases a tension in the fastener retaining component to cause the first elongated member and the second elongated member to engage with an inner surface of the fastener receiving element and to retain a fastener within the fastener receiving element,
   a middle portion, of the first elongated member, being configured to engage with a top surface of a head of the fastener, and
   a middle portion, of the second elongated member, being configured to engage with the top surface of the head of the fastener.

14. The fastener retaining component of claim 13, wherein the first middle portion and the second middle portion are a same middle portion shared by the first elongated member and the second elongated member.

15. The fastener retaining component of claim 13, wherein the first elongated member and the second elongated member are formed from a same sheet of material.

16. The fastener retaining component of claim 13, wherein the first elongated member comprises:
   a first set of component engaging elements extending from a first end of the first elongated member to engage with the inner surface of the fastener receiving element,
   a second set of component engaging elements extending from a second end of the first elongated member to engage with the inner surface of the fastener receiving element,
      the first end of the first elongated member being opposite the second end of the first elongated member, and
wherein the second elongated member comprises:
   a third set of component engaging elements extending from a first end of the second elongated member to engage with the inner surface of the fastener receiving element, and
   a fourth set of component engaging elements extending from a second end of the second elongated member to engage with the inner surface of the fastener receiving element,
      the first end of the second elongated member being opposite the second end of the second elongated member.

17. The fastener retaining component of claim 16, further comprising:
   a third elongated member comprising:
      a fifth set of component engaging elements extending from a first end of the third elongated member to engage with the inner surface of the fastener receiving element,
      a sixth set of component engaging elements extending from a second end of the third elongated member to engage with the inner surface of the fastener receiving element,
         the first end of the third elongated member being opposite the second end of the third elongated member,
      wherein the first elongated member, the second elongated member, and the third elongated member are separate elements.

18. The fastener retaining component of claim 13, wherein the fastener retaining component comprises spring steel.

19. The fastener retaining component of claim 1, wherein the first elongated member comprises spring steel, and
wherein the second elongated member comprises spring steel.

20. The system of claim 7, wherein the middle portion, of the first elongated member, and the middle portion, of the second elongated member, are a same middle portion shared by the first elongated member and the second elongated member.

* * * * *